July 28, 1953   P. R. ENZLER   2,646,613
METHOD OF MAKING SWITCH CONTACTS
Filed Sept. 12, 1946

Inventor
Paul Robert Enzler
By
McCanna and Morsbach
Attys.

Patented July 28, 1953

2,646,613

UNITED STATES PATENT OFFICE 2,646,613

METHOD OF MAKING SWITCH CONTACTS

Paul Robert Enzler, Freeport, Ill., assignor, by mesne assignments, to Minneapolis-Honeywell Regulator Company, Minneapolis, Minn., a corporation of Delaware Application September 12, 1946, Serial No. 696,558

9 Claims. (Cl. 29—155.55)

This invention relates to an improved switch contact of the kind having a contact surface of good contact metal, such as silver, gold or platinum, on a supporting base of cheaper conductive metal; it also relates to a method of making this improved switch contact.

One conventional contact member of this type is made from a continuous strip of gilding metal laminated with a continuous overlay of the precious metal, in thicknesses of .020 inch or more. The contact member is stamped in the desired shape from this laminated strip and is assembled with the precious metal side engageable with the mobile contact means employed. Such a contact is wasteful of the expensive overlay material because the latter extends over its entire surface and not over just the relatively small surface which is engageable with the mobile contact.

Another conventional contact which is employed in an attempt to conserve the overlay material has a small disk of this material attached to the surface of a supporting member by means of riveting, welding or soldering. In making a contact by this latter method the advantage of using less of the overlay material is at least partially cancelled out by the added expense of the extra riveting, welding or soldering operation. Furthermore, it is inherently more bulky, requiring a larger and, therefore, more expensive housing, due to the fact that the disk mounted atop the base member means a double thickness for each contact assembly.

It is a primary object of the present invention to provide a contact member of minimum thickness, employing a minimum of the relatively expensive precious metal overlay material, yet employing no welding or soldering to hold the precious metal in place.

Another object of the present invention is the provision of an improved contact member having an inlay of desirable contact metal mounted in a depression on a supporting member, the inlay being engaged within the support solely by mechanical edge mounting means.

A specific object is the provision of an improved contact member in which a disk of silver or like material is inlaid within a circular depression formed in a base member of brass or like material, a peripheral portion of the base member around the depression being staked or displaced inwardly over the edge of the inlay to hold it firmly in place.

Another object is a method by which an improved contact is made by forming in the surface of a base member a recess or depression to accommodate an insert of relatively better contact material, followed by deforming and displacing a portion of the base member surrounding the recess inward over the periphery of the insert.

Another object is the provision of a method of making a contact of improved compactness, cheapness, and reliability by forming an aperture through a sheet of base material such as brass, coining a larger recess over the aperture in such a manner as to cause the brass material to flow together and substantially close the end of the aperture opposite the recess, inserting a disk of silver or like material in the recess, and concurrently deforming the disk radially outwardly and deforming a continuous portion of the base member inward over the edge of the disk to hold it permanently in place.

Other objects and advantages will become apparent from the following description in connection with the drawings, in which—

Figure 3:
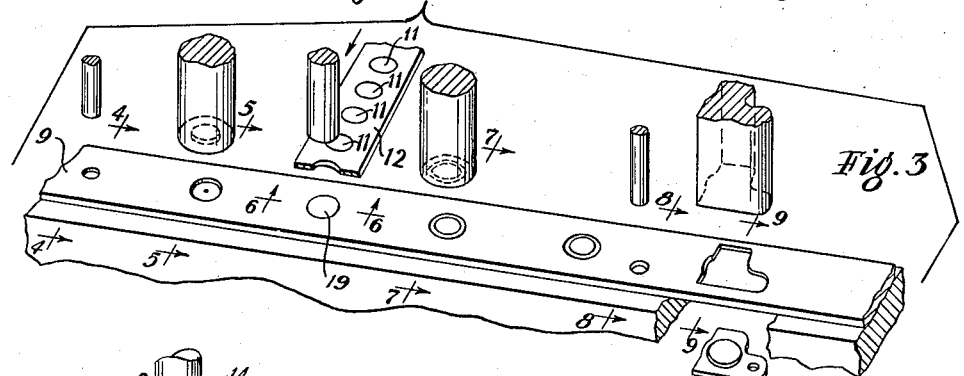
Fig. 3 is a fragmentary perspective schematic view illustrating the various steps of forming a contact such as shown in Fig. 2 in accordance with the method of the present invention.
Figure 5:
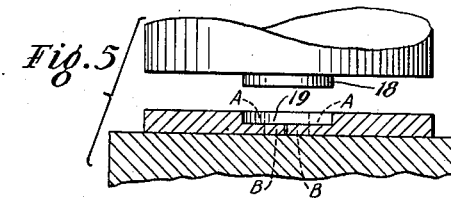
Figure 6:
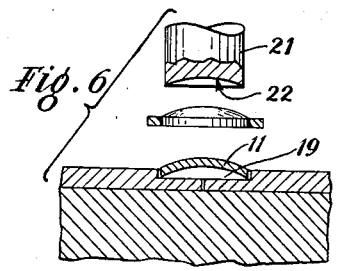
Figures 7, 7A:
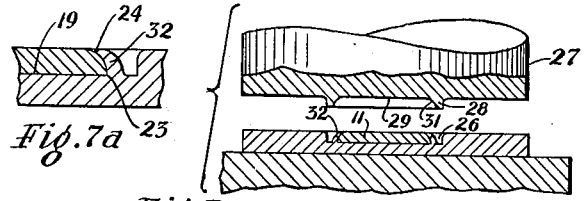

Figs. 4, 5, 6, 7, 8 and 9 are sectional views of Fig. 3 taken along the lines 4—4, 5—5, 6—6, 7—7, 8—8, and 9—9, respectively, and Fig. 7a is an enlarged view of a portion of Fig. 7.

Figure 1:
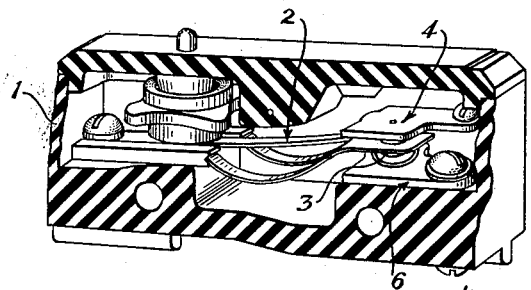
Figure 1 is a cut-away perspective view of one type of switch employing stationary contacts of the kind dealt with by the present invention.

For purposes of illustration the type of contact the present invention is concerned with, is shown in Figure 1 as embodied in an electric snap switch. In the switch construction shown herein, the insulating housing 1 encloses a spring system generally designated 2 carrying a mobile contacting element 3 by snap action between upper and lower stationary contacts 4 and 6. These stationary contacts as conventionally made were from a continuous sheet of gilding metal having a continuous overlay of silver on the side engaging the mobile contact; or they have riveted, welded or soldered on their inner surfaces silver contact elements—both of which conventional contacts are undesirable for the reasons pointed out above.

The present invention is concerned, therefore, with forming an improved contact such as indicated by the numerals 4 and 6. In the improved contact 6 of Fig. 2 it will be noted that the expensive silver or other contact material is employed only as a relatively small, flush, circular insert 7 mounted at the position where it is needed to engage the mobile contact element 3 and the remainder of the contact 6 consists of a supporting portion 8 of base material, such as brass or other relatively inexpensive material.

Considering now my novel method of producing this improved contact, the method is such that it may be an entirely continuous process. Furthermore it contemplates eliminating all conventional operations including riveting, welding, soldering, or any other use of heat.

Fig. 3 shows more or less diagrammatically one method of producing this contact by an entirely automatic means. This particular means forms no part of the present invention and hence is not shown in great detail. A continuous strip 9 of brass, for example, will be hitched to the right, from station to station during which the separate coining, pressing and punching operations are performed. The silver or other precious metal inserts 11 will be hitched forward periodically, carried in the strip 12 and placed on the brass strip 9 within the indentations previously formed to receive them. Means (not shown) will have previously punched the round pellets 11 out of the strip 12, formed them with the concavo-convex shape shown in Fig. 6, and then replaced them in the strip 12 (as shown in Figs. 3 and 6) for conveyance to a position over the brass strip 9.

Figure 2:
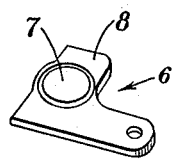
Fig. 2 is an enlarged perspective view of the lower stationary contact in the Figure 1 switch.
Figure 4:
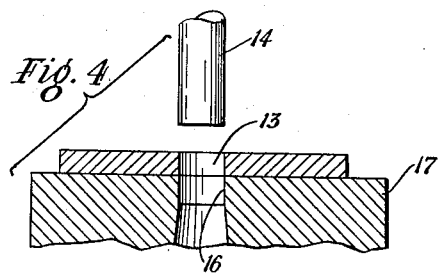

With the strips 9 and 12 being hitched, respectively, to the right and forward periodically in unison (by hitching means forming no part of the present invention and therefore not shown), the making of one contact member such as indicated by the numeral 6 in Fig. 2 will be traced as follows: as shown in detail in Fig. 4, an aperture 13 will first be punched through the center of the brass strip or sheet 9 by the coaction of the punch 14 with die hole 16 formed in the die block 17. For the insertion of a silver pellet 11 which is approximately .215 inch in diameter and .021 inch thick in a brass strip 9 having a nominal thickness of .040 inch, I have found that the initial aperture 13 should be approximately .125" in diameter. It will be obvious, however, as the description proceeds that the specific dimensions given may be varied considerably and still give satisfactory results, the specific features being presented only by way of illustration to provide a more complete description of the invention.

Next, as shown in Fig. 5, the coining die 18 will be pressed over the aperture 13 to displace the brass material from area A to area B to form a substantially closed flat bottomed recess or indentation 19 therein. This indentation will be wider and shallower than the originally formed aperture, as will be seen by comparison of Figs. 4 and 5. In this particular case, the depth of the depression 19 will be approximately .020" and the diameter .235". Obviously, a brass material of high ductility will be preferred in order to effectively close the end of the depression 19; in this connection, I have found that the type of brass known as gilding metal performs satisfactorily in this respect.

Next, as shown in Fig. 6, one of the inserts 11 of silver or other contact material will be placed in the depression 19 by reciprocable rod 21 which pushes it out of the strip 12. The rod 21, as shown in Fig. 6, has its end portion formed with a concave surface 22 to more effectively engage the upper convex surface of this insert.

The inserts, as pointed out above, will have been previously punched from the strip by means not shown, formed with a concavo-convex shape which in this particular case will be with .200" radius on the concave side, then replaced temporarily in the strip 12 as a simple expedient for carrying it forward into alignment with the depression 19. This concavity on the bottom side is preferred and is an important part of the present invention in the respect that it provides for the pellet to be dropped readily in place within the depression 19 and subsequently wedged tightly therein by outward expansion when it is flattened. Furthermore, this concavity of the lower surface provides for an outward expansion of the lower edge 23 to a greater extent than the upper edge 24 when the pellet is substantially flattened against the bottom of the depression 19. This is shown much enlarged and somewhat exaggerated in Fig. 7a.

At the next step, as shown in Fig. 7, a continuous peripheral groove 26 will be staked or indented around the insert 11 concurrently with the flattening thereof by the die member 27 which has the raised annular indenting or staking portion 28. The center portion 29 of the die 27 in this particular instance is flat to flatten the pellet 11 and expand it radially outward at the same time the inward radius 31 is displacing the wall 32 radially inward to overhang the expanded lower edge 23. The pellet is thus permanently edge mounted by entirely mechanical means and without the necessity of employing any operations using heat, such as welding or soldering. In one operation, it is changed from a concavo-convex shape with a straight cylindrical peripheral wall to a flat shape having a substantially frusto-conical peripheral wall permanently engaged beneath the inward overhanging lip 32 constituting the wall of the depression 19. Usually, to make the structure as compact as possible the top of the insert will be formed flat as shown and substantially flush with the top of the brass sheet 9. However, where desired, various other shapes and sizes of the top of the insert will be possible by suitably forming the center surface 29 of the die and by suitably varying the pellet thickness.

Figure 8:
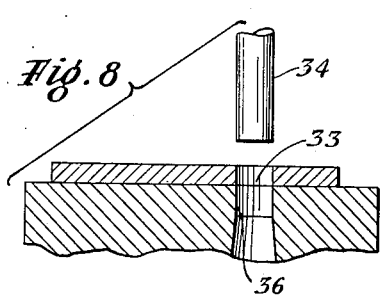

At the next position, as shown in Fig. 8, mounting means for the contact 6, namely the aperture 33, will be formed by the coaction of the punch 34 and the die hole 36.

Figure 9:
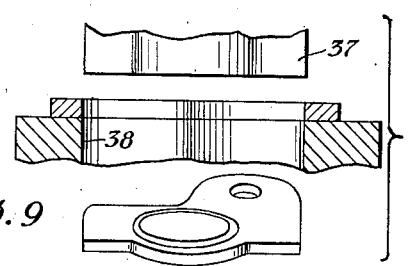

At the next and last step, as shown in Fig. 9, the completed formed contact will be punched from the sheet 9 by coaction of the punch 37 in die hole 38.

I have found that, in general for a contact of this size, it is preferable that the insert 11 when made of silver have a minimum thickness of .020", this being sufficient to give the desired strength to hold it in place when edge mounted in accordance with this invention and provides enough silver stock to make possible a long service life which may involve several million operations.

In the method just described I have disclosed an initial punching of the aperture 13. This is one important part of the present invention in that it provides for initially disposing of base material which would otherwise be displaced upward around the outside of the depression 19 when the latter is formed; furthermore, this initial punching minimizes the necessary displacement of metal when the depression 19 is subsequently formed, thereby permitting use of a number of high strength base materials which otherwise could not be used due to their relatively low ductility. However, it should be understood that it is also within the scope of the present invention to dispense with this initial punching of aperture 13 in certain cases, as where a sheet of highly ductile base material is employed in which case the process may be begun by coining the depression 19 in any suitable manner. Furthermore, while I have shown the bottom surface of the insert 11 initially concave and the bottom of the depression 19 initially flat, generally any method in which the centers of these elements are initially spaced apart and their edge portions engaged (as shown in Fig. 6) would be satisfactory in providing for the desired outward radial expansion of the insert when pressed down into place (Figs. 7 and 7a). Furthermore, the particular order of steps need not necessarily be followed as outlined although this is preferable where the method is to be applied to the particular contact shown in a completely automatic process; for instance, if preferred, the punching of the terminal from the sheet 9, as shown in Fig. 9, may be performed first and the various other operations then performed on it.

While a particular form of contact and a particular method of producing it has been shown to illustrate the present invention it will be apparent that minor changes therein will readily suggest themselves to others skilled in the art without departing from the spirit and scope of the invention. Having thus described the invention, what is claimed as new is:

1. The method of forming a contact by inlaying an insert member in the surface of a base member comprising the steps as follows: forming an aperture in the base member; displacing base material from one end of the aperture to substantially close the other end of said aperture to form a recess opening on to one surface of the base member; placing an insert member within said recess; pressing at least the peripheral edges of the insert firmly into engagement with a portion of the base member adjacent said recess; and indenting the base member around the insert to displace a portion of the base member inwardly upon the edges of the insert to hold it in place by mechanical engagement.

2. The method of forming a contact comprising the steps as follows: forming an opening in a base member for said contact; enlarging the top of the opening and reducing the bottom of the opening by displacing base member material from a location around the top edge of the opening to a location at the bottom of the opening, thereby transforming the opening into an indentation with a substantially closed bottom; placing an inlay member of relatively better contact material within said indentation, said inlay member having a concave surface facing the bottom of the indentation; pressing the inlay member into engagement with the bottom of the indentation and concurrently displacing base member material from around the indentation inward toward and over the edge of the inlay member to hold it firmly in place.

3. The method of making a contact by placing an insert of contact material in the surface of a base member comprising the steps of: forming an opening in the surface of the base member; displacing the base member material surrounding the top of the opening into the bottom of the opening whereby the opening is transformed into a substantially closed-bottomed indentation of greater width than said opening originally but of less depth than said opening originally; forming the insert from flat ductile material to have a concavo-convex shape; placing said insert into said indentation with its concave surface toward said base; and pressing the insert member into abutment with the bottom of the indentation and concurrently displacing certain of the edge material of the indentation inward over the periphery of the insert to lock it in place by mechanical engagement.

4. The method of forming a contact by mounting an insert of contact material on the surface of a base member comprising the steps as follows: forming a substantially closed-bottomed indentation in the base member by first removing material therefrom to form an aperture therein and then displacing material from around the top of the aperture into the bottom thereof; forming the insert from flat ductile material so as to have substantially the shape of said indentation and sufficiently smaller so as to fit therein; placing the insert within said indentation; displacing a continuous portion of the wall of said indentation radially inward toward said insert in such a manner that the top of the wall is displaced to a relatively greater extent than the bottom of said wall and is characterized by a substantial inward overhang; and pressing said insert into said indentation to expand the member radially outward beneath said overhang.

5. A method of forming a contact element, comprising the steps of feeding a strip of base metal along a predetermined path, punching an opening of a predetermined size in the strip, stamping the strip adjacent the opening with a punch having a larger diameter than the predetermined size of said opening to enlarge the top of the opening and reduce the bottom of the opening to form an indentation of predetermined configuration, feeding a strip of inlay material having better electrical characteristics than the base metal along a path overlying the path of movement of the strip of base metal and in timed relation with the movement thereof, forming inlay inserts having a concave surface from said strip of inlay material, placing one of the inlay inserts in each indentation with the concave surface facing the bottom of the indentation, concurrently punching the insert into engagement with the bottom of the indentation and deforming and displacing the strip of base metal adjacent the indentation toward and over the peripheral edge of the insert of inlay material to hold it firmly in place and blanking the contact element of predetermined shape from the strip of base material subsequent to the positioning of the insert in the indentation.

6. A method of forming a contact element, comprising the steps of: feeding a strip of base metal along a predetermined path, forming a succession of openings on the strip, deforming the strip adjacent each opening to enlarge the top of the opening and reduce the bottom of the opening to form an indentation of predetermined configuration, feeding contact inlay inserts having a concave surface along a predetermined path, disposing one inlay insert in each indentation with the concave surface facing the bottom of the indentation, forcing the insert into engagement with the bottom of the indentation and concurrently deforming and displacing the strip of base metal adjacent the indentation toward and over the peripheral edge of the insert of inlay material to hold it firmly in place and fashioning the contact element of predetermined shape from the strip of base material subsequent to the positioning of the inlay insert in the indentation.

7. The method of making contact elements comprising feeding a strip of base metal in step fashion along a predetermined path, forming indentations of predetermined configuration at spaced positions on said strip, forming inlay inserts at spaced positions on a strip of inlay material having better electrical characteristics than the base metal, feeding the strip of inlay material stepwise along a predetermined path in superimposed relation to the path of movement of the base metal strip and in timed relation thereto to successively bring the inserts over the indentations, displacing the inserts from the strip of insert material into the indentations, pressing an insert in each indentation into firm engagement with the bottom of the indentation, concurrently displacing the metal of the base metal strip in the area adjacent the edge of the inlay toward and over the edge of the inlay to retain it in place and thereafter blanking a contact element of predetermined shape from the strip of base metal.

8. The method of making an electrical contact element which includes the steps of forming a sheet metal base member to provide an indentation therein of lesser depth than the thickness of said member, the indentation having a substantially flat bottom and side walls substantially normal to the bottom, stamping an insert from sheet metal having better contact properties than the base member and forming the insert to concavo-convex shape having side walls normal to a plane common to the perimeter of the inlay, the inlay being shaped for free reception in said indentation with the perimeter thereof in spaced relation to the side walls of the indentation, inserting the inlay in the indentation with the concave surface of the inlay engaging said flat bottom, thereafter applying a force to the convex side of the inlay to flatten the same against the bottom of the indentation and thereby expand the lower edge of the inlay side walls to a greater extent than the upper edge thereof to slope the inlay side walls and bring the lower edge thereof into intimate electrical contact with the walls of the indentation adjacent the bottom, and simultaneously displacing a portion of the base member forming the sidewalls of the indentation inwardly over the sloping side walls of the inlay.

9. The method of making an electrical contact element which includes the steps of forming in a metallic base member an indentation having upstanding side walls, stamping an insert from flat metal having better contact properties than the base member and forming the insert to concavo-convex shape having side walls normal to a plane including the perimeter of the inlay, the inlay being shaped for free reception in said indentation, inserting the inlay in the indentation with the concave surface of the inlay facing the bottom of the indentation, thereafter applying a force to the convex side of the inlay to flatten the same against the bottom of the indentation and thereby expand the lower edge of the side walls to a greater extent than the upper edge thereof to slope the side walls of the inlay and bring the lower edge into intimate electrical contact with the walls of the indentation adjacent the bottom thereof and substantially simultaneously plastically deforming the base member adjacent to but in spaced relation to the perimeter of the inlay to form an upstanding wall around the inlay and displace the wall inwardly over the sloping side walls of the inlay.

PAUL ROBERT ENZLER.

References Cited in the file of this patent

UNITED STATES PATENTS

| Number | Name | Date |
|--------|------|------|
| 793,307 | Lachman | June 27, 1905 |
| 1,007,372 | Miller | Oct. 31, 1911 |
| 1,046,823 | McBerty | Dec. 10, 1912 |
| 1,541,749 | Hommel | June 9, 1925 |
| 1,561,872 | Lovejoy | Nov. 17, 1925 |
| 1,704,228 | Tibbets | Mar. 5, 1929 |
| 1,792,552 | Siegmund | Feb. 17, 1931 |
| 1,928,443 | Archer | Sept. 26, 1933 |
| 2,045,960 | Payne | June 30, 1936 |
| 2,064,998 | Waite | Dec. 22, 1936 |
| 2,117,353 | Park | May 17, 1938 |
| 2,137,617 | Imes | Nov. 22, 1938 |
| 2,140,465 | Bangs | Dec. 13, 1938 |
| 2,190,125 | Sembdner | Feb. 13, 1940 |
| 2,208,411 | Crabbs | July 16, 1940 |
| 2,216,510 | Burns | Oct. 1, 1940 |
| 2,361,089 | Cox | Oct. 24, 1944 |
| 2,406,327 | Friedrich | Aug. 27, 1946 |
| 2,414,598 | Klipper | Jan. 21, 1947 |
| 2,419,469 | Spiro | Apr. 22, 1947 |